(12) United States Patent  
Vasilievna et al.

(10) Patent No.: US 8,122,181 B2
(45) Date of Patent: Feb. 21, 2012

(54) SYSTEMS AND METHODS FOR ENHANCING A DATA STORE FOR HANDLING SEMANTIC INFORMATION

(75) Inventors: Trichina Elena Vasilievna, Munich (DE); Carvounas Christophe, Cedex Plessis-Trevise (FR); Florian Bauch, Oberhaching (DE)

(73) Assignee: Spansion LLC, Sunnyvale, CA (US)

( * ) Notice: Subject to any disclaimer, the term of this patent is extended or adjusted under 35 U.S.C. 154(b) by 567 days.

(21) Appl. No.: 12/270,616

(22) Filed: Nov. 13, 2008

(65) Prior Publication Data

US 2010/0122047 A1    May 13, 2010

(51) Int. Cl.
*G06F 12/06* (2006.01)
(52) U.S. Cl. ........................... 711/103; 711/154
(58) Field of Classification Search .......... None
See application file for complete search history.

(56) References Cited

U.S. PATENT DOCUMENTS

| | | | |
|---|---|---|---|
| 2004/0088473 A1* | 5/2004 | Ogle | 711/100 |
| 2007/0192532 A1* | 8/2007 | Ogle | 711/103 |
| 2008/0091878 A1 | 4/2008 | Stern et al. | |
| 2008/0239811 A1* | 10/2008 | Tanaka | 365/185.11 |
| 2009/0157948 A1* | 6/2009 | Trichina et al. | 711/103 |

* cited by examiner

*Primary Examiner* — Than Nguyen
(74) *Attorney, Agent, or Firm* — Frommer Lawrence & Haug LLP; Matthew M. Gaffney (57) ABSTRACT

Systems (100) and methods (300) for enhancing a data store (DS) addressable at a block level and interfaced with a host device (HD) via a memory controller (MC), which may comprise a VMCC (110, 210). The methods involve receiving an access operation (AO) from HD (104) at MC. In response to receiving the AO, plug-ins (232) are invoked. The plug-ins include a pre-processing plug-in ($232_4$) for facilitating an indexing function of MC and/or a post-processing plug-in ($232_5$) for facilitating a monitoring function of MC. The methods also involve accessing DS (106, 206) to read a bock of data therefrom, write the block of data thereto, or erase the block of data therefrom in accordance with the AO. The methods further involve obtaining post-processing information about the AO in response to an invocation of the post-processing plug-in and updating a log-file (224) stored in the DS with the post-processing information.

17 Claims, 5 Drawing Sheets

SYSTEMS AND METHODS FOR ENHANCING A DATA STORE FOR HANDLING SEMANTIC INFORMATION

BACKGROUND OF THE INVENTION

1. Statement of the Technical Field

The invention relates to data stores for pre-recorded and recordable media, such as a flash memory device. More particularly, the invention relates to systems and methods for enhancing data store device architectures with in-built capabilities allowing unobtrusive implementation of copy detection and copy prevention mechanisms.

2. Description of the Related Art

As use of and demand for consumer communication devices increases, advancements in size, performance and functionality are constantly being developed and improved. For example, many consumer devices (such as content players, cellular phones, or the like) employ a mass media electrically programmable storage device to house a wide variety of data. Generally, the host device can connect to the mass media storage device by way of a standard interface such as MultiMediaCard (MMC), Secure Digital (SD), Universal Serial Bus (USB), etc., and data can be transmitted according to one of these protocols.

Accordingly, applications running on the host device can read and write blocks of data to the mass storage device as well as erase (usually larger blocks called sectors) data from the mass storage device, but commands at the level of a file system are unavailable to the typical storage device interface. Therefore, a storage device does not have "semantic" knowledge or information about blocks of data that are being read, written or erased by the mass storage device while this knowledge is being processed by a host. The semantic knowledge or information can include, but is not limited to, information indicating whether two (2) or more consecutive blocks of data belong to the same file, information indicating if an erased sector contains blocks of data from the same or different files, and information indicating the form in which the data is represented.

However, modern flash memory devices have one or more embedded logic microcontrollers which control and drive basic operations, such as read operations, write operations, and erase operations. As execution of these operations become more complex due to shrinking technology, the embedded flash microcontrollers have to provide more varied and general functionality.

Semantic knowledge or information is useful for detecting whether a given file is being copied to or "consumed" by another device. Detection and prevention of unauthorized copying of content from pre-recorded or recordable media is a serious concern for many context providers. However, complex, expensive and/or non-user-friendly copy prevention schemes do not meet requirements in some application, such as an automotive navigation application.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Embodiments of the present invention will now be described with respect to FIGS. 1-3C. Embodiments of the present invention relate to systems and methods for enhancing a data store (e.g., a flash memory device) addressable at a block level. The data store can include an embedded general-purpose microcontroller. In such a scenario, the functionality of the data store is enhanced so as to handle "semantic" information. The "semantic" information can include, but is not limited to, information about a file system, information about blocks of data, information indicating whether two (2) or more consecutive blocks of data belong to the same file, information indicating if an erased sector contains blocks of data from the same or different files, and information indicating the form in which the data is represented. Embodiments of the present invention also provide a non-invasive approach to copy detection and copy prevention based on intelligent pre-processing and post-processing information stored on a storage media.

According to embodiments of the present invention, the data store is interfaced with a host device via a memory controller comprising a virtual memory card controller (VMCC). The VMCC will be described in some detail herein in relation to FIGS. 1-2. A more complete description of the VMCC is provided in U.S. Publication No. 2008/0091878 to Stern et al. The methods of the present invention generally involve receiving an access operation from the host device at the memory controller. In response to receiving the access operation, the memory controller invokes a pre-processing plug-in to facilitate an indexing function of the memory controller and/or a post-processing plug-in to facilitate a monitoring function of the memory controller. Thereafter, the data store is accessed to read a bock of data therefrom, write the block of data thereto, or erase the block of data therefrom in accordance with the access operation. Subsequent to accessing the data store, post-processing operations are performed. The post-processing operations can be performed by the previously invoked post-processing plug-in. The post-processing operations can involve obtaining post-processing information about the access operation and updating a log-file stored in the data store with the post-processing information.

In the following description of the FIGS. 1-3C, numerous specific details are set forth in order to provide a thorough understanding of the various embodiments. It may be evident, however, that the embodiments may be practiced without these specific details. In other instances, well-known structures and devices are shown in block diagram form in order to facilitate describing the embodiments of the present invention.

As used in this application, the terms "component," "module," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture", as used herein, is intended to encompass a computer program accessible from any computer-readable device, carrier, or media. For example, computer readable media can include, but is not limited to, magnetic storage devices (e.g., hard disks, floppy disks, and magnetic strips), smart cards, and flash memory devices (e.g., cards, sticks, and key drives). Additionally, it should be appreciated that a carrier wave can be employed to carry computer-readable electronic data such as those used in transmitting and receiving electronic mail or in accessing a network such as the Internet or a Local Area Network (LAN). Of course, those skilled in the art will recognize many modifications may be made to this configuration without departing from the scope or spirit of the claimed subject matter.

Moreover, the word "exemplary", as used herein, means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

As used herein, the words "transparent" or "transparently" when used in connection with an interface to a host can refer to an interaction in a manner that does not disturb a normal interaction between the host device and a mass storage device (or data store). In addition, these terms can mean that the host device is unaware of the existence of certain extended capabilities and/or that no modification of the host device or applications thereon is required in order to utilize the features described herein.

Figure 1:
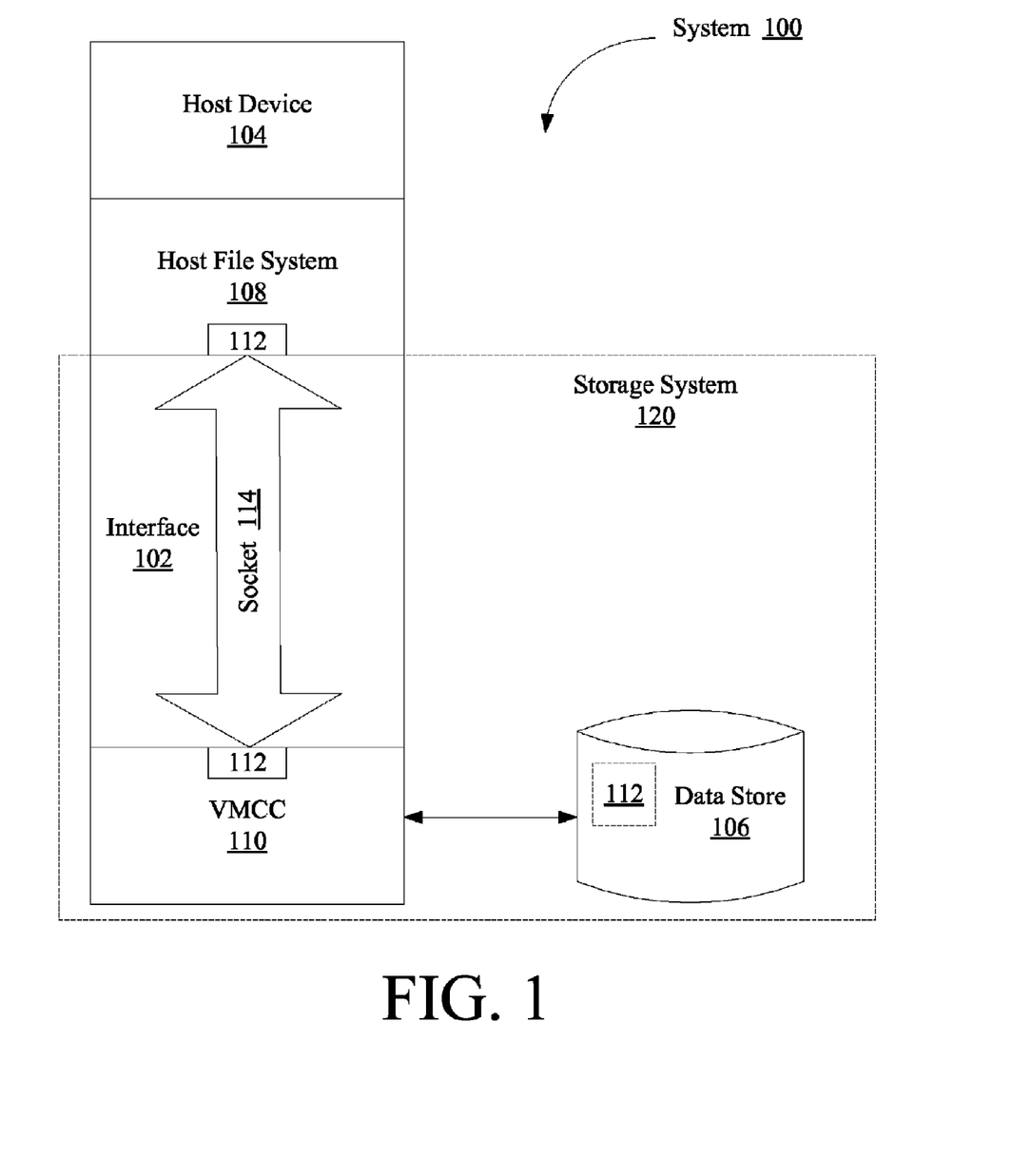
FIG. 1 illustrates a system that can transparently employ read operations, write operations, and/or erase operations at a block level.

Referring now to FIG. 1, there is provided a system 100 that can transparently employ standard read, write or erase operations at a block level. As shown in FIG. 1, the system 100 can include a storage system 120 interfaced with a host device 104 via an interface 102. The interface 102 can conform to a standard protocol for communicating with a data store 106. The host device 104 can be any electronic device with a processor capable of running a host application (not shown) and interfacing (e.g., by way of interface 102) with a mass storage device (e.g., a storage system 120 and/or a data store 106). Such electronic devices include, but are not limited to, cellular phones, personal digital assistants, digital cameras, organizers, digital recorders, MPEG-1 Audio Layer-3 players, pagers, electronic toys, electronic games, scanners, readers, personal computers, and laptops.

The storage system 120 can be a smart card or a storage device in which the host device 104 relies upon a host file system 108 in order to access data in the data store 106. For example, the storage system 120 is a subscriber identity module card, a universal subscriber identity module card, a universal integrated circuit card, a universal serial bus key drive, or a disk drive. The file system 108 is configured according to a File Allocation Table (FAT). The file system 108 is generally configured for presenting a hierarchical view of the data in the data store 106 to the host device 104.

The data store 106 is a block device that is addressable at a block level, wherein a plurality of data blocks belong to a sector having a length of 512 bytes or 1024 bytes. The data store 106 can comprise a flash memory with a Flash Translation Layer (FTL). FTLs are well known to those having ordinary skill in the art, and therefore will not be described herein. However, it should be understood that the FTL is generally configured for managing bad data blocks and "wear" of the flash while providing a simple logical sector interface to a higher level file system (e.g., the file system 108). For example, if an MP3 file is stored on the data store 106 beginning at block 10 of sector 12345, then the file system 108 can present a hierarchical path view "\music\song.mp3". Access to this path can be translated by the file system 108 to route an appropriate access operation (e.g., a read, a write, or an erase) to block 10 of sector 12345 of the data store 106.

As shown in FIG. 1, the storage system 120 also includes a VMCC 110. The VMCC 110 can be a software application that runs on a central processing unit (not shown), a universal serial bus (USB) drive controller (not shown), or an secure digital (SD) controller (not shown). The VMCC 110 can also be a hardware circuit operatively coupled to the central processing unit (not shown), the USB drive controller (not shown), or the SD controller (not shown). The VMCC 110 can further be a device that replaces the central processing unit (not shown), the USB drive controller (not shown), or the SD controller (not shown).

The VMCC 110 is configured for controlling access to the data store 106. The VMCC 110 is also configured for advertising a special object 112 to the file system 108 employed by the host device 104. The special object 112 can be a special file, a special directory, a special partition, a special file system, or another abstract data type relating to file system hierarchy.

According to an embodiment of the invention, the special object 112 comprises one or more special files that are each one sector or block in length. The one or more special files 112 physically reside on the data store 106. In such a scenario, advertising the special file(s) 112 to the host file system 108 is substantially similar to any other file or data residing on the data store 106. Embodiments of the present invention are not limited in this regard. For example, the special object 112 can alternatively be a virtual file addressable to the file system 108 as a dynamic extension to the data store 106.

Referring again to FIG. 1, the special objects 112 can serve as "triggers" for applications that can run on the central processing unit (not shown), the USB drive controller (not shown), the SD controller (not shown), or the VMCC 110. For example, the VMCC 110 can open a bi-directional communication channel (e.g., a socket 114) between the host device 104 and the central processing unit (not shown), the USB drive controller (not shown), the SD controller (not shown), or VMCC 110 (or an application running thereon). Upon receipt of an access operation (e.g., a read block operation, a write block operation, and an erase block operation) directed to the special object 112, the VMCC 110 can call one or more applications (not shown) to handle the requested access operation. The VMCC 110 can also invoke one or more pre-processing plug-ins provided to facilitate an indexing function and a post-processing plug-in provided to facilitate a monitoring function. These pre-processing and post-processing plug-ins will be described below in relation to FIGS. 2-3C.

Figure 2:
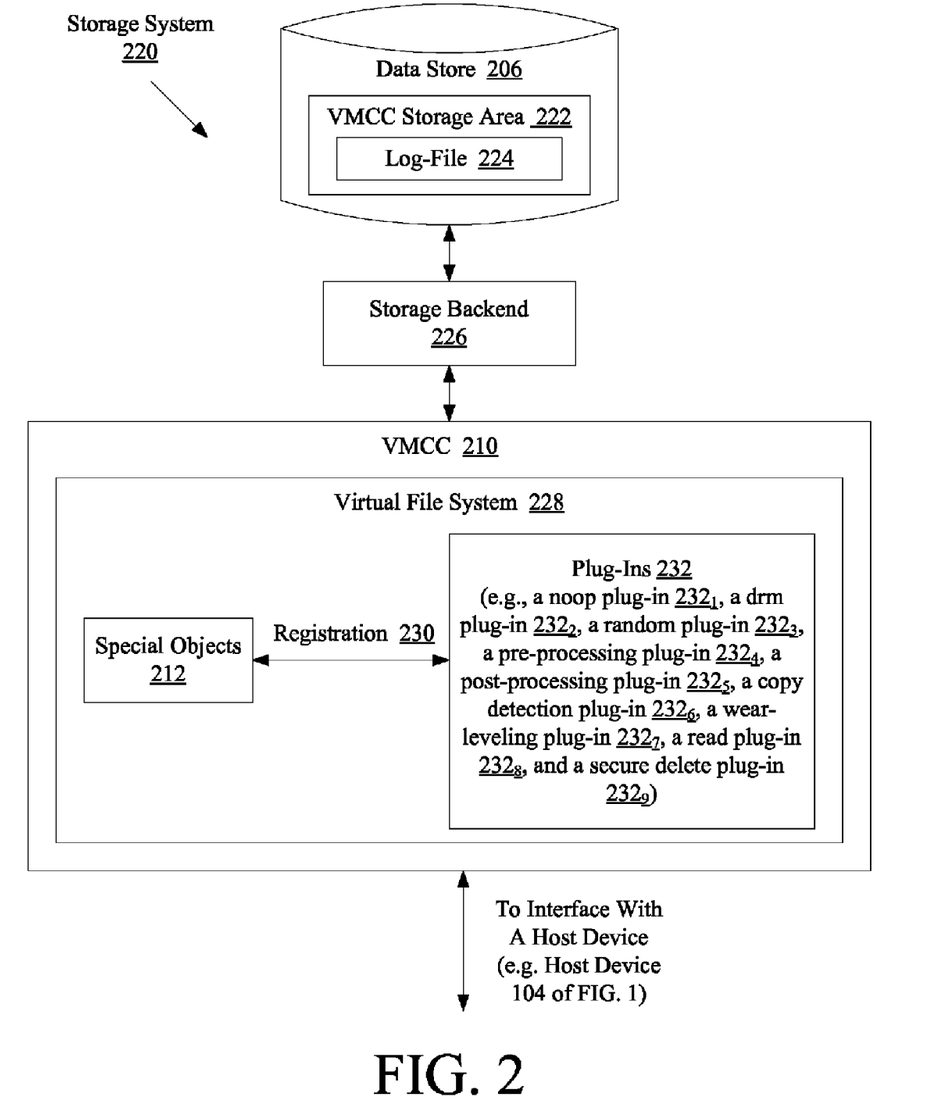
FIG. 2 is an exemplary storage system that can transparently extend a virtual file system with registered plug-ins.

Referring now to FIG. 2, there is provided a detailed block diagram of an exemplary storage system 220 that can transparently extend a virtual file system with registered plug-ins.

The storage system 220 of FIG. 2 illustrates an exemplary architecture of the storage system 120 of FIG. 1. The invention is not limited in this regard.

As shown in FIG. 2, the VMCC 210 can communicate with the data store 206 having a VMCC storage area 222 by way of a storage backend 226. The VMCC 210 is the same as or substantially similar to the VMCC 110 of FIG. 1. Similarly, the data store 206 is the same as or substantially similar to the data store 106 of FIG. 1. The storage backend 226 is configured to facilitate low-level disk accesses to the data store 206. According to an embodiment of the invention, the storage backend 226 includes a hierarchical file system facilitating the storing of a block of data in the data store 206, the retrieval of a block of data from the data store 206, the erasure of a block of data from the data store 206, or the erasure of a sector of data from the data store 206. The invention is not limited in this regard. For example, the storage backend 226 can alternatively employ a mechanism with directories, subdirectories, and/or other abstract data types configured for facilitating the storing of a block of data in the data store 206, the retrieval of a block of data from data store 206, the erasure of a block of data from data store 206, and the erasure of a sector of data from the data store 206.

As also shown in FIG. 2, the VMCC 210 includes a virtual file system 228. The virtual file system 228 is configured for supplying a pseudo-view of the data on the data store 206. The virtual file system 228 is extended by way of various plug-ins 232. The VMCC 210 presents the special objects 212 of the virtual file system 228 (e.g., a pseudo-view of the data on the data store 206) to a host device (e.g., the host device 104 described above in relation to FIG. 1). The special objectes 212 are the same as or substantially similar to the special objects 112 of FIG. 1. After presenting the special objects 212 of the virtual file system 228 to the host device (e.g., host device 104 of FIG. 1), the VMCC 210 can receive access operations (e.g., read block operations, write block operation, and erase block operation) from the host device. Once the VMCC 210 receives an access operation, it maps the access operation to a logical path in the virtual file system 228 based upon a table (not shown) stored in the VMCC storage area 222.

For example, the VMCC 210 can determine (e.g., based upon the data table) that an access to block 10 of sector 23456 corresponds to a logical path named "\some\specific\path". Based upon this logic path, the VMCC 210 invokes the appropriate plug-in 232 (e.g., the plug-in 232 that has registered itself as being authoritative over a special object 212 defined by paths that begin with \some) and forwards the information included with the access operation thereto. After invoking the \some plug-in 232, the VMCC 210 requests the particular file (e.g., \specific\path) and forwards it to the \some plug-in 232 along with other information (such as a file offset). Embodiments of the present invention are not limited in this regard.

It should be understood that the VMCC 210 need not be responsible for actively populating the paths associated with various plug-ins 232. Rather, the VMCC 210 can query the plug-ins 232 to determine which paths the individual plug-ins 232 have declared themselves to be authoritative by way of registration 230 upon those paths/special objects 212. Additionally or alternatively, the VMCC 210 can receive an unsolicited registration 230 message from one of the plug-ins 232 indicating which special objects 212 (e.g., special directories, special files, and/or the paths associated therewith) over which the particular plug-in 232 has authority. The VMCC 210 can record and track this information in order to instantiate the proper plug-in 232 upon receipt of an access to a special object 212 that is associated therewith.

It should also be understood that conventional direct access to files on the data store 206 can also be handled by way of a plug-in 232. For example, an access to actual data on the data store 206 that does not implicate a special object 212 can still be routed to a noop plug-in $232_1$. The noop plug-in $232_1$ can register (e.g., by way of registration 230) itself as authoritative over the root level of the virtual file system 228. For instance, the noop plug-in $232_1$ can be branched at the "\" directory. The role of the noop plug-in $232_1$ can be to simply forward access operations (e.g., read block operations, write block operations, and erase block operations) to the storage backend 226. Thus, standard behavior for file access in the absence of authority exerted by another plug-in 232 can match traditional behavior of the underlying protocol of the interface.

The noop plug-in $232_1$ can also perform compression on the fly in order to save physical storage space on the data store 206. For example, the noop plug-in $232_1$ can be equipped with a configurable flag to determine whether data is forwarded directly to the storage backend 226 or whether the data should be compressed beforehand. If the data is to be compressed prior to being forwarded to the storage backend 226, then the data compression is handled by the noop plug-in $232_1$ or by a distinct compression plug-(not shown) automatically called by the noop plug-in $232_1$.

As shown in FIG. 2, the virtual file system 228 of the VMCC 210 can also be extended by a drm plug-in $232_2$ branched under a "\drm" directory and a random plug-in $232_3$ branched under the "\random" file of the "\special" directory. The "\special" directory is a real directory to be handled by the noop plug-in $232_1$ or a special directory automatically created by the VMCC 210 at the time of registration 230 of the random plug-in $232_3$. Any access to the data store 206 that does not invoke the drm plug-in $232_2$ or the random plug-in $232_3$ is handled by default by the noop plug-in $232_1$. For example, a read block operation or a write block operation to the path "\music\song.mp3" results in an associated read or write to the data store 206 that is routed through the storage backend 226 and handled by the noop plug-in $232_1$. In contrast, a read block operation to "\special\random" by-passes the noop plug-in $232_1$. In such a scenario, the VMCC 210 instantiates the random plug-in $232_3$ and transfers the data associated with the read block operation to the random plug-in $232_3$. Upon receipt of the data, the random plug-in $232_3$ performs its designated processing to supply random data.

Similarly, a read block operation to "\drm\music\song.mp3" is forwarded to the drm plug-in $232_2$, thereby by-passing the noop plug-in $232_1$. Upon receipt of the access operation, the drm plug-in $232_2$ accesses the "\music\song.mp3" file in the data store 206. The drm plug-in $232_2$ can check privileges and/or decrypt the "\music\song.mp3" file prior to sending a reply to the host device (e.g., the host device 104 of FIG. 1) that originated the access operation. The drm plug-in $232_2$ can be responsible for registering the file structures for which it has authority and for populating its own virtual directory with virtual files. As such, the drm plug-in $232_2$ can choose to mimic the hierarchy of all or a subset of the physical files on the data store 206. Additionally or alternatively, the drm plug-in $232_2$ can manage its own private storage area (not shown) that can be similar to or a part of the VMCC storage area 222. The private storage area (not shown) can be inaccessible by way of the noop plug-in $232_1$.

As also shown in FIG. 2, the virtual file system 228 of the VMCC 210 can further be extended by a pre-processing plug-in $232_4$ branched under a "\pre-processing" directory and a post-processing plug-in $232_5$ branched under the "\post-processing" directory. The pre-processing plug-in $232_4$ is invoked when the access operation is a write block operation. The pre-processing plug-in $232_4$ facilitates an indexing function of the VMCC 210. The indexing function provides a way of placing semantic information about data stored in the data store 206 within the storage system 220. Such semantic information can include, but is not limited to, the identity of the blocks of data that belong to a particular file and the status (e.g., live or dead) of a block of data. The semantic information can be used by the VMCC 210 to enhance the performance of the storage system 220 and/or increase its functionality. The indexes are stored in the VMCC storage area 222 and are accessible to the VMCC 210.

The pre-processing plug-in $232_4$ can generally embed static information about the virtual file system 228 in the data store 206. Such static information can include, but is not limited to, information describing the format of log-file 224, information describing the format of i-nodes (not shown), and information indicating the location of data structures. I-nodes are well known to those having ordinary skill in the art, and therefore will not be described in detail herein. However, it should be understood that an i-node is a data structure on the data store 206 configured for storing information about a file, a directory, or other file system object. The static information can be obtained during a manufacturing stage of the storage system 220 or an installation of the storage system 220 within the system 100 (described above in relation to FIG. 1). The pre-processing plug-in $232_4$ can also generally update the log-file 224 when write block operations are performed. The log-file 224 can be updated by creating an i-node.

The post-processing plug-in $232_5$ is invoked when the access operation is a read block operation, a write block operation, and an erase block operation. The post-processing plug-in $232_5$ facilitates a monitoring function of the VMCC 210. The monitoring function provides a way of predicting a user's (not shown) access operation behavior, thereby enhancing the functional behavior of the storage system 220.

The post-processing plug-in $232_5$ can generally monitor accesses to the data store 206 by the host device (e.g., the host device 104 of FIG. 1) and obtain post-processing information. Such post-processing information can include, but is not limited to, monitoring information and statistical information. The monitoring data can include information indicating a set of blocks, pages and/or sectors that belong to a particular file or index. The monitoring data can also include information indicating the type of data stored in a particular block, page and/or sector. The monitoring data can further include information describing a relationship between blocks, pages and/or sectors. The statistical information can include information indicating the frequency of access operations relating to the blocks, pages and/or sectors.

The monitoring function of the post-processing plug-in $232_5$ enables "new" functional behaviors of the storage system 220. Such "new" functional behaviors include, but are not limited to, a copy detection functional behavior, an optimized wear-leveling functional behavior, an optimized read functional behavior, and a secure delete functional behavior. Each of the "new" functional behaviors can be implemented by a plug-in 232 ranched under a particular directory.

The copy detection functional behavior can be implemented by a copy detection plug-in $232_6$. The copy detection plug-in $232_6$ can generally use monitoring information (or post-processing information) to determine if blocks of a particular file are being read with an access speed indicating that the file is being copied (as opposed to being read) by the host device (e.g., the host device 104 of FIG. 1). The copy detection plug-in $232_6$ can also generally take remedial measures for preventing unauthorized copying of the file. Such remedial measures can include, but are not limited to, displaying a warning message to a user of the host device (e.g., the host device 104 of FIG. 1), slowing down read block operations to a typical time required for a playing device to play a previously copied block, allowing the copying of a file only upon user approval, and limiting the number of copies made of a particular file.

According to an embodiment of the invention, the copy detection plug-in $232_6$ maintains a FAT for copyrighted content stored in the data store 206. The copy detection plug-in $232_6$ also copies the FAT from its position in the data store 206 to a random access memory (not shown) of the host device (e.g., the host device 104 of FIG. 1) and/or the storage system 220. After each access operation, the VMCC 210 writes the block number being accessed, the time of the access operation, and the type of the access operation (i.e., a read block operation, a write block operation, or an erase block operation) into the log-file 224. The copy detection plug-in $232_6$ also scans the log-file 224 to infer if a particular file is being copied. This inference can be made based on the number of read block operations made during a given time period. The copy detection plug-in $232_6$ further takes a remedial measure if it is inferred that the particular file is being copied. Embodiments of the present invention are not limited in this regard.

The optimized wear-leveling functional behavior can be implemented by a wear-leveling plug-in $232_7$. The wear-leveling plug-in $232_7$ can generally reorganize data stored in the data store 206 during idle states of the storage system 220. This data reorganization can be performed based on monitoring and statistical information (or post-processing information) obtained by the post-processing plug-in $232_5$. The monitoring information can indicate information defining a file allocation, information indicating a file access pattern, and information indicating the type of data stored in each block of the data store 206. For example, if the statistical information indicates that block nine (9) of sector two (2) is accessed the least of all the data blocks, then block nine (9) is moved to another location in the data store 206. Embodiments of present invention are not limited in this regard. The wear-leveling plug-in $232_7$ can also de-stage data in an ascending order of "logical addressing". In such a scenario, blocks of data for a particular file are moved to adjacent locations within one sector of the data store 206. Such a sector based data organization can reduce de-fragmentation of a file.

The optimized read functional behavior can be implemented by a read plug-in $232_8$. The read plug-in $232_8$ can generally perform burst read operations. The burst read operations can be enabled by data re-organization in which data related to the same file are moved to adjacent locations within one sector.

The secure delete functional behavior can be implemented by a secure delete plug-in $232_9$. The secure delete plug-in $232_9$ can be invoked when an access operation is an erase block operation. The secure delete plug-in $232_9$ can generally use post-processing information to determine if the block of the data is a specific type of block (e.g., a sensitive block of data). If the block of data is determined to be the specific type of block (e.g., a sensitive block of data), then the secure delete plug-in $232_9$ can copy the remaining block of data in the respective sector to another sector of the data store 206. Thereafter, the secure delete plug-in $232_9$ can erase the sector to which the block of data belongs.

Figure 3A:
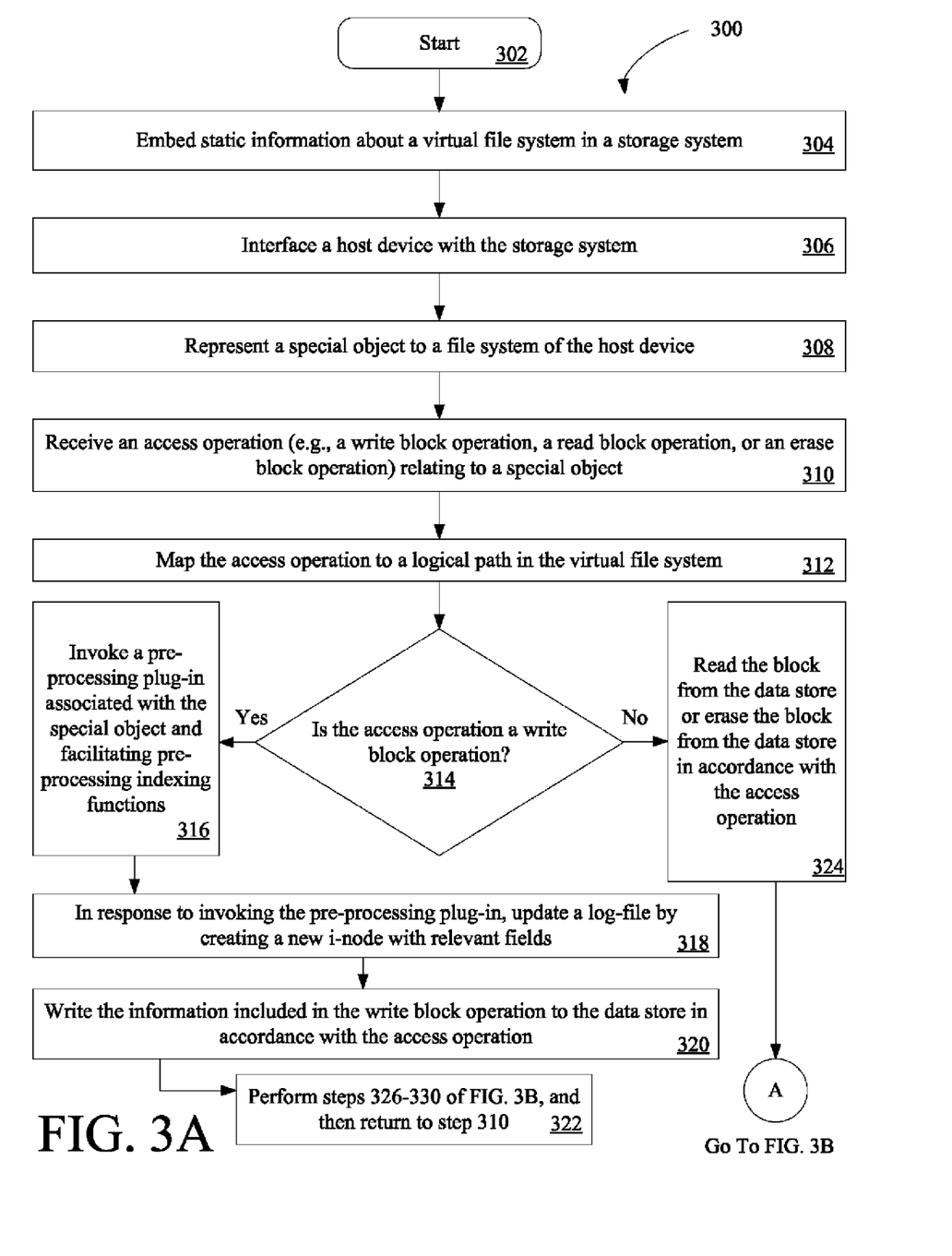
FIGS. 3A-3C collectively illustrate an exemplary method for enhancing a data store addressable at a block level and interfaced with a host device via a memory controller.
Figure 3B:
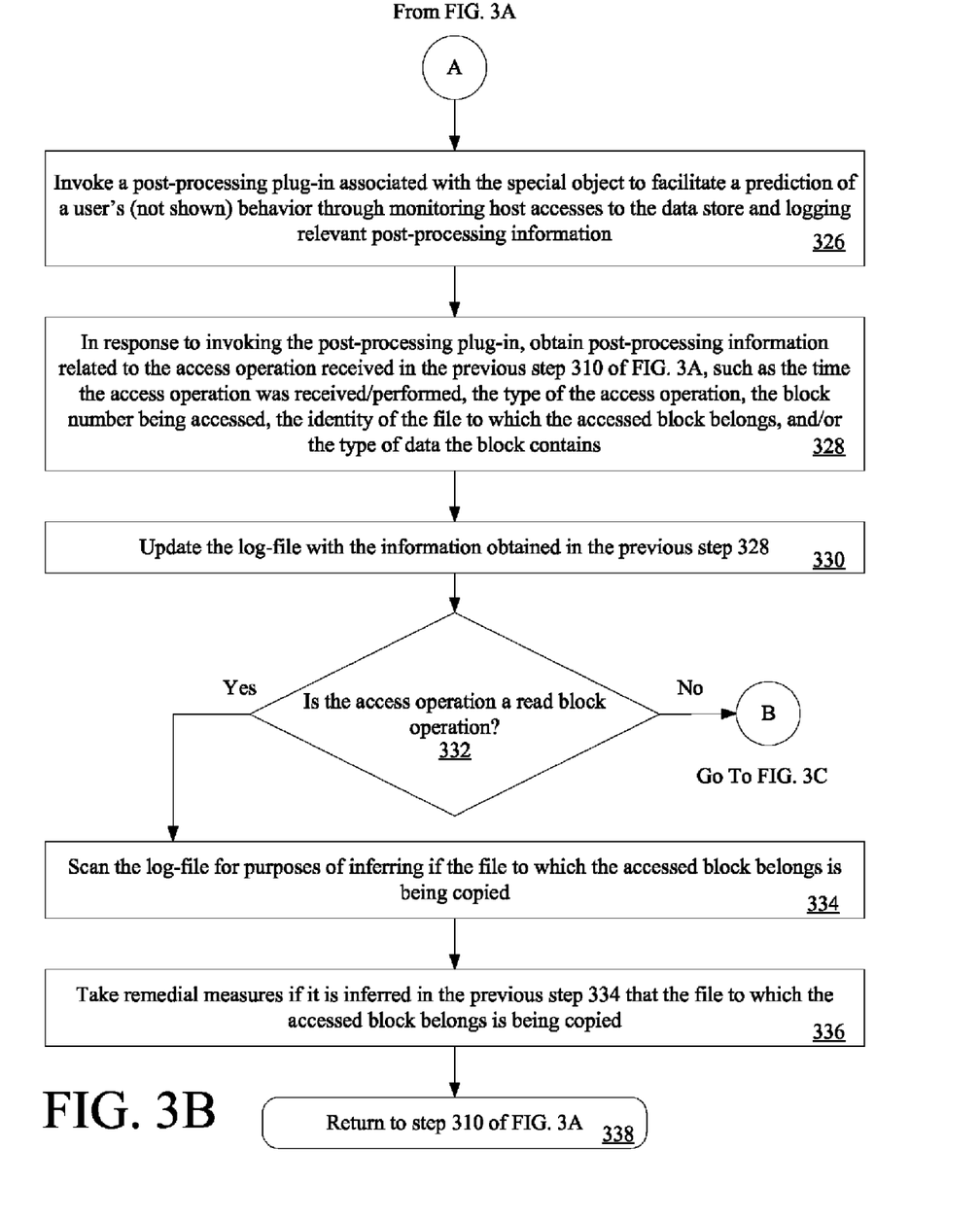
Figure 3C:
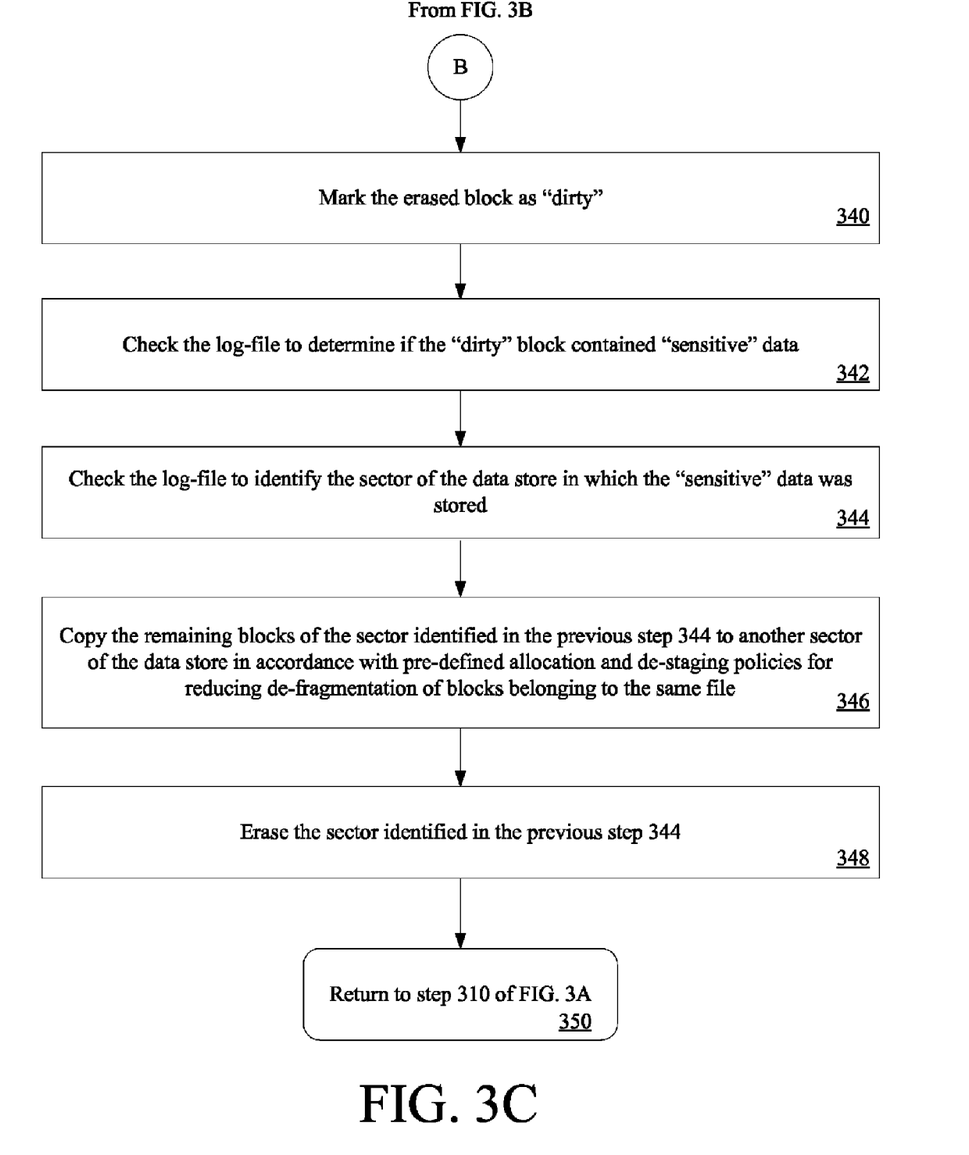

FIGS. 3A-3C collectively illustrate a process flow diagram 300. While, for purposes of simplicity of explanation, the one or more methods shown herein, e.g., in the form of a flow chart, are shown and described as a series of acts, it is to be understood and appreciated that the subject invention is not limited by the order of acts, as some acts may, in accordance with the claimed subject matter, occur in a different order and/or concurrently with other acts from that shown and described herein. For example, those having ordinary skill in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 3A, an exemplary method 300 is provided for enhancing the data store 106, 206 addressable at a block level and interfaced with a host device (e.g., host device 104 of FIG. 1) via a memory controller (e.g., the VMCC 110, 210, a central processing unit comprising the VMCC 110, 210, or another type of microcontroller comprising the VMCC 110, 210). As shown in FIG. 3A, the method 300 starts at step 302 and continues to step 304. In step 304, static information about a virtual file system (e.g., the virtual file system 228 of FIG. 2) is embedded in a storage system (e.g., the storage system 120 described above in relation to FIG. 1 or storage system 220 described above in relation to FIG. 2). Thereafter, step 306 is performed where a host device (e.g., the host device 104 of FIG. 1) is interfaced with the storage system. Once the host device and the storage system are communicatively coupled, step 308 is performed where a special object (e.g., the special object 112 described above in relation to FIG. 1 or the special object 212 described above in relation to FIG. 2) is represented to the host device.

Upon completing step 308, the method 300 continues with step 310. In step 310, an access operation (e.g., a read block operation, a write block operation, or an erase block operation) relating to the special object is received at the memory controller of the storage system. Subsequent to receiving the access operation, step 312 is performed where the memory controller maps the access operation to a logical path in the virtual file system. Thereafter, the method 300 continues with a decision step 314. The decision step 314 is performed for determining if the access operation is a write block operation.

If the access operation is a write block operation [314: YES], then the method 300 continues with step 316. In step 316, a pre-processing plug-in (e.g., the pre-processing plug-in $232_4$ described above in relation to FIG. 2) associated with the special object is invoked. The pre-processing plug-in generally facilitates pre-processing indexing functions. In response to invoking the pre-processing plug-in, steps 318 and 320 are performed. In step 318, the pre-processing plug-in updates a log-file (e.g., the log-file 224 of FIG. 2). Step 318 can involve creating a new i-node with relevant fields. I-nodes are well known to those having ordinary skill in the art, and therefore will not be described herein. In step 320, the pre-processing plug-in writes the information included in the access operation to the data store. Subsequent to completing the post-processing operations, the method 300 continues with step 322 where post-processing operations are performed. The post-processing operations can be implemented by a post-processing plug-in (e.g., the post-processing plug-in $232_5$ described above in relation to FIG. 2). The post-processing operation will be described below in relation to steps 326-330 of FIG. 3B. Step 322 can also involve returning to step 310 when the post-processing operations are completed.

If the access operation is not a write block operation [314: NO], then step 324 is performed where a block of data is read or erased from the data store in accordance with the access operation. Thereafter, the method 300 continues with step 326 of FIG. 3B. Step 326 involves invoking a post-processing plug-in (e.g., the post-processing plug-in $232_5$ described above in relation to FIG. 2) associated with the special object. The post-processing plug-in facilitates the prediction of user (not shown) behavior through monitoring host access to the data and logging relevant post-processing information. In response to invoking the post-processing plug-in, steps 328 and 330 are performed. In step 328, the post-processing plug-in obtains post-processing information related to the access operation. Such post-processing information can include, but is not limited to, information indicating the time the access operation was received at the memory controller or fully performed by the storage system, information indicating the type of access operation (e.g., a read block operation, a write block operation, or an erase block operation), information identifying the block of data being accessed, information identifying the file to which the accessed block of data belongs, and information indicating the type of data the accessed block contains (or contained). In step 330, the post-processing plug-in updates the log file with the post-processing information.

Subsequent to completing the post-processing operation, the method 300 continues with a decision step 332. The decision step 332 is performed for determining if the access operation is a read block operation. If the access operation is a read block operation [332:YES], then the method 300 continues with step 334. In step 334, the log-file is scanned for purposes of inferring if the file to which the accessed block of data belongs is being copied. As should be understood, step 334 can be performed by a previously invoked copy detection plug-in (e.g., the copy detection plug-in $232_6$ described above in relation to FIG. 2). Thereafter, step 336 is performed where remedial measure can be taken if it is inferred that the file is being copied. Such remedial measures can include, but are not limited to, displaying a warning message to a user of the host device, slowing down read block operations to a typical time required for a playing device to play a previously copied block, allowing the copying of a file only upon user approval, and limiting the number of copies made of a particular file. As should be understood, step 336 can also be performed by the previously invoked copy detection plug-in. Upon completing the remedial measures, step 338 is performed where the method 300 returns to step 310 of FIG. 3A.

If the access operation is not a read block operation [332: NO], then the method 300 continues with steps 340-348 of FIG. 3C. Steps 340-348 generally described secure delete operations. The secure delete operations can be performed by an invoked secure delete plug-in (e.g., the secure delete plug-in $232_9$ described above in relation to FIG. 2). Step 340 involves marking the erased block as "dirty". Step 342 involves checking the log-file to determine if the "dirty" block contained "sensitive" data. Step 344 involves checking the log-file to identify the sector of the data store in which the "sensitive" data was stored.

After identifying the sector of the data store in which the "sensitive" data was stored, step 346 is performed where the remaining blocks of the identified sector are copied to another sector of the data store in accordance with pre-defined allocation and de-staging policies. These policies are selected for reducing de-fragmentation of blocks belonging to the same file. Subsequent to copying the remaining blocks to another sector of the data store, step 348 is performed where the identified sector is erased. Thereafter, step 350 is performed where the method 300 returns to step 310 of FIG. 3A.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

We claim:

1. A method for enhancing a data store addressable at a block level, comprising acts of:
   receiving at a memory controller an access operation communicated from a host device that is interfaced with the data store via the memory controller;
   in response to receiving the access operation, facilitating a monitoring function of the memory controller by invoking a post-processing plug-in;
   accessing the data store in accordance with the access operation, said accessing act including reading a block of data from the data store, writing the block of data to the data store, or erasing the block of data from the data store;
   obtaining post-processing information about the access operation in response to invoking the post-processing plug-in;
   updating a log-file stored in the data store with the post-processing information; and
   performing a copy detection operation using the post-processing information when the access operation is a read block operation.

2. The method according to claim 1, wherein the act of performing a copy detection operation further includes using the post-processing information to infer if a file to which the information contained in the read block operation belongs is being copied.

3. The method according to claim 2, wherein the act of performing a copy detection operation further includes taking at least one remedial measure if it is inferred that the file is being copied.

4. The method according to claim 1, further comprising the act of performing a delete operation if the access operation is an erase block operation.

5. A method for enhancing a data store addressable at a block level, comprising acts of:
   receiving at a memory controller an access operation communicated from a host device that is interfaced with the data store via the memory controller;
   in response to receiving the access operation, facilitating a monitoring function of the memory controller by invoking a post-processing plug-in;
   accessing the data store in accordance with the access operation, said accessing act including reading a block of data from the data store, writing the block of data to the data store, or erasing the block of data from the data store;
   obtaining post-processing information about the access operation in response to invoking the post-processing plug-in;
   updating a log-file stored in the data store with the post-processing information; and
   performing a delete operation if the access operation is an erase block operation, wherein the act of performing a delete operation further includes using the post-processing information to determine if the block of data is a specific type of block and erasing a first sector to which the block of data belongs if the block of data is determined to be the specific type of block.

6. The method according to claim 5, wherein the act of performing a delete operation further includes copying a plurality of remaining blocks of the first sector to a second sector of the data store prior to erasing the first sector.

7. The method according to claim 5, further comprising the act of facilitating an indexing operation of the memory controller by invoking a pre-processing plug-in when the access operation is a write block operation.

8. The method according to claim 7, further comprising the act of updating indexing information of the log-file with semantic information about data included in the access operation, in response to an invocation of the pre-processing plug-in.

9. A method for enhancing a flash memory addressable at a block level, comprising acts of:
   receiving at a virtual memory card controller an access operation communicated from a host device that is interfaced with the data store via the virtual memory card controller;
   in response to receiving the access operation, facilitating at least a monitoring function of the virtual memory card controller by invoking at least one plug-in;
   accessing the data store in accordance with the access operation, said accessing act including reading a block of data from the data store, writing the block of data to the data store, or erasing the block of data from the data store;
   obtaining post-processing information about the access operation in response to invoking the plug-in;
   updating a log-file stored in the data store with the post-processing information; and
   performing at the virtual memory card controller a copy detection operation, a secure delete operation, or a data reorganization operation using the post-processing information of the log-file.

10. A system, comprising:
    a data store addressable at a block level; and
    a memory controller configured to receive an access operation communicated from a host device interfaced with the data store, invoke one or more plug-ins in response to receiving the access operation, access the data store in accordance with the access operation, obtain post-processing information about the access operation in response to an invocation of the one or more plug-ins, and update a log-file stored in the data store with the post-processing information;

wherein the plug-ins include at least one of a pre-processing plug-in to facilitate an indexing function of the memory controller or a post-processing plug-in to facilitate a monitoring function of the memory controller, and wherein the memory controller is further configured to perform a copy detection operation using the post-processing information when the access operation is a read block operation.

11. The system according to claim 10, wherein the memory controller comprises at least one means for advertising a special object to a file system of the host device, receiving the access operation directed to the special object, and calling at least one application to handle the access operation.

12. The system according to claim 10, wherein the data store is a flash memory.

13. The system according to claim 10, wherein the memory controller is further configured to
use the post-processing information to infer if a file to which the information contained in the read block operation belongs is being copied, and
take at least one remedial measure if it is inferred that the file is being copied.

14. The system according to claim 10, wherein the memory controller is further configured to perform a delete operation if the access operation is an erase block operation.

15. A system, comprising:
a data store addressable at a block level; and
a memory controller configured to receive an access operation communicated from a host device interfaced with the data store, invoke one or more plug-ins in response to receiving the access operation, access the data store in accordance with the access operation, obtain post-processing information about the access operation in response to an invocation of the one or more plug-ins, and update a log-file stored in the data store with the post-processing information;
wherein the plug-ins include at least one of a pre-processing plug-in to facilitate an indexing function of the memory controller or a post-processing plug-in to facilitate a monitoring function of the memory controller, and wherein the memory controller is further configured to erase a first sector to which the block of data belongs if the block of data is a specific type of block.

16. The system according to claim 15, wherein the memory controller is further configured to copy a plurality of remaining blocks of the first sector to a second sector of the data store prior to erasing the first sector.

17. The system according to claim 15, wherein the memory controller is further configured to update indexing information of the log-file with semantic information about data included in the access operation, in response to an invocation of the pre-processing plug-in when the access operation is a write operation.

* * * * *

UNITED STATES PATENT AND TRADEMARK OFFICE
CERTIFICATE OF CORRECTION

PATENT NO. : 8,122,181 B2
APPLICATION NO. : 12/270616
DATED : February 21, 2012
INVENTOR(S) : Trichina Elena Vasilievna et al.

It is certified that error appears in the above-identified patent and that said Letters Patent is hereby corrected as shown below:

On the Title Page, in field (57), in Abstract, in column 2, line 10, delete "bock" and insert -- block --, therefor.

In column 2, line 39, delete "bock" and insert -- block --, therefor.

In column 5, line 31, delete "objectes" and insert -- objects --, therefor.

In column 6, line 24, delete "plug-(not shown)" and insert -- plug-in (not shown) --, therefor.

In column 10, line 27, delete "log file" and insert -- log-file --, therefor.

In column 11, line 42, in Claim 1, delete "controller:" and insert -- controller; --, therefor.

Signed and Sealed this
Nineteenth Day of March, 2013

Teresa Stanek Rea
*Acting Director of the United States Patent and Trademark Office*